United States Patent [19]

Murcott

[11] 3,712,148
[45] Jan. 23, 1973

[54] BALL SCREW JACK

[75] Inventor: Andrew James Murcott, Bridgnorth, England

[73] Assignee: H. M. Hobson Limited, London, England

[22] Filed: May 5, 1971

[21] Appl. No.: 140,523

[52] U.S. Cl. .............................................. 74/424.8 R
[51] Int. Cl. ............................................... F16h 1/18
[58] Field of Search ........................... 74/424.8 R, 459

[56] References Cited

UNITED STATES PATENTS

| | | | |
|---|---|---|---|
| 2,151,094 | 3/1939 | Fiorentino | 74/424.8 R |
| 3,377,878 | 4/1968 | Maroth | 74/424.8 R |
| 3,482,459 | 12/1969 | Cantalupo et al. | 74/89.15 |
| 3,518,891 | 7/1970 | Denkowski | 74/89.15 |
| 3,543,598 | 12/1970 | Lanzenberger | 74/424.8 R |
| 3,583,248 | 6/1971 | Langenberg | 74/89.15 |

*Primary Examiner*—Leonard H. Gerin
*Attorney*—Martin Kirkpatrick

[57] ABSTRACT

The invention relates to a ball screw jack for operating an aircraft flap, comprising a body, a rotary input member mounted in the body and constrained against axial movement with respect to the body, a ball screw also rotatably mounted in the body, a nut mounted on the ball screw, taper rollers interposed between angled faces on the input member and on the screw and serving to transmit torque from the input member to the screw, and a preload spring connecting the input member and the screw and urging the input member and the screw together, the drive through the taper rollers from the input member to the screw having a greater mechanical advantage than the drive from the screw to the nut.

4 Claims, 2 Drawing Figures

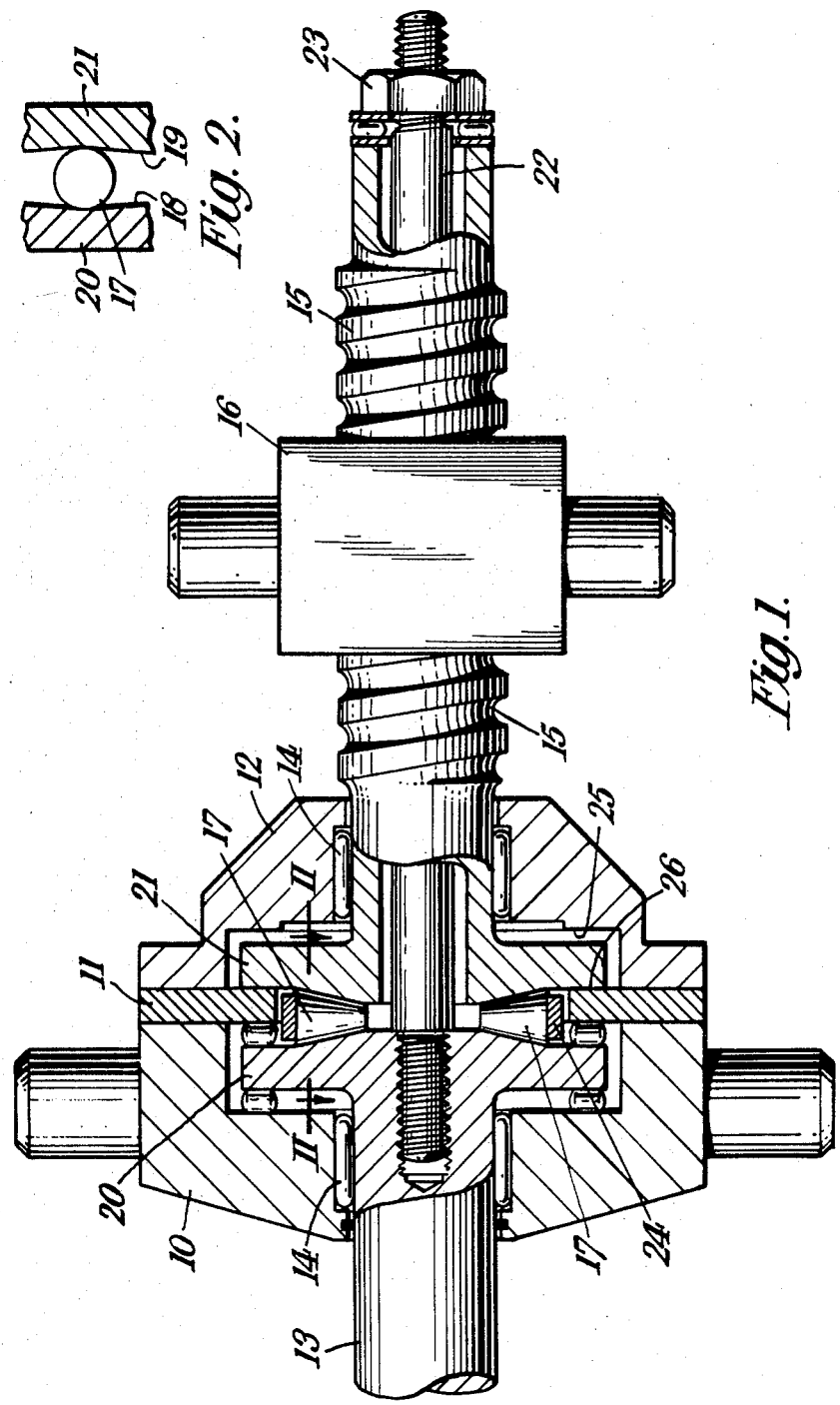

BALL SCREW JACK

This invention provides a ball screw jack for operating an aircraft flap system. In a typical environment the jack is required:

1. To extend the flap against an increasing compressive load.
2. To retract the flap against a tensile load having a maximum value very much less than the maximum compressive load.
3. To retract with up to maximum compressive load.
4. To extend with up to maximum tensile load.

The ball screw jack according to the invention comprises a body, a rotary input member mounted in the body and constrained against axial movement with respect to the body, a ball screw also rotatably mounted in the body, a nut mounted on the ball screw, taper rollers interposed between angled faces on the input member and on the screw and serving to transmit torque from the input member to the screw, and a preload spring connecting the input member and the screw and urging the input member and the screw together, the drive through the taper rollers from the input member to the screw having a greater mechanical advantage than the drive from the screw to the nut.

One embodiment of ball screw jack according to the invention will now be described in detail, by way of example, with reference to the accompanying diagrammatic drawing in which:

FIG. 1 is a section through the jack and
FIG. 2 is a section on the line II—II in FIG. 1.

The jack illustrated comprises a body formed of three parts 10, 11, 12 suitably secured together. A rotary input member, mounted in bearings 14, is constrained against axial movement with respect to the body and transmits torque to a screw 15 carrying a nut 16 connected to the flap (not shown) to be operated. Recirculating balls are accommodated in the portion of the thread of the screw 15 within the nut 16. The torque is transmitted by taper rollers 17, held in position by a collar 24 and interposed between angled faces 18, 19 (FIG. 2) on heads 20, 21 on the input member 13 and on the screw 15. A stiff preload spring, constituted by a rod 22, is screwed at its left hand end into the input member 13 and carries at its right hand end a nut 23 which is rotatably mounted on the end of the screw 15.

The torque which the input member 13 can transmit to the screw is is dependent upon the following factors:
a. The load applied by the spring 22 and holding the input member 13 and the screw 15 together.
b. The pitch of the angled faces 18, 19 of the members 13 and 15.

When there is no load on the jack the torque is transmitted by virtue of the preload spring 22 which holds members 13 and 15 together. When the torque exceeds a certain value dependent on the spring load the members 13 and 15 will separate.

In normal operation any torque increase is associated with an increase in end load so that the members 13 and 15 will be held together with an increasing load as the compressive load increases.

The drive from the member 13 to the screw 15 has a greater mechanical advantage than from the screw 15 to the nut 16. The members 13 and 15 will consequently separate when the compressive load on the nut 16 reaches a predetermined value.

In the case of a tensile load on the nut 16, the load is supported by the spring 22 so that the members 13 and 15 will separate at a level of tensile load considerably less than the compressive load which causes them to separate.

When the separation of members 13 and 15 reaches a certain limit, the screw 15 comes into contact with a face 25 on the body of the jack. This will cause the torque from the input member 13 to be locked through to the body of the jack and the whole system will be brought to rest.

In order that under static conditions the torque caused by the load should be reacted by the body of the jack and to prevent movement in the event of drive shaft failure, a face 26 on the screw 15 contacts the portion 11 of the body. Under these conditions the rollers 17 are completely unloaded. When the input member 13 starts to drive, it will take up the drive on the rollers 17 which will tend to lift the face of the screw 15 off the portion 11 of the body. At loads less than maximum, torque will be lost to the body, but this loss will decrease to zero when maximum load is reached.

The above-described jack has the following advantages:

1. It is capable only of producing its maximum compressive load plus a margin — typically 20 percent.
2. It is capable only of producing its maximum tensile load plus a margin — typically 20 percent.
3. Should the drive to the jack become detached the load on the screw, up to maximum compressive or tensile, will not cause the screw to rotate.
4. At maximum load on the screw the excess torque required to drive the screw against or with following load depends only upon losses in rotating parts such as bearings and shaft seals.
5. Should a torque be produced in the screw which is not associated with an end load then this torque is limited to a value less than the torque required to produce maximum end load.

What I claim as my invention and desire to secure by Letters Patent is:

1. A ball screw jack for operating an aircraft flap, comprising a body, a rotary input member mounted in the body and constrained against axial movement with respect to the body, a ball screw also rotatably mounted in the body, a nut mounted on the ball screw, taper rollers interposed between angled faces on the input member and on the screw and serving to transmit torque from the input member to the screw, and a preload spring connecting the input member and the screw and urging the input member and the screw together, the drive through the taper rollers from the input member to the screw having a greater mechanical advantage than the drive from the screw to the nut.

2. A jack as claimed in claim 1, wherein a face on the screw contacts the body under static conditions.

3. A jack as claimed in claim 1, in which the screw is arranged to contact a face on the body when the screw has separated from the input member to a predetermined extent.

4. A jack as claimed in claim 2 in which the screw is arranged to contact a face on the body when the screw has separated from the input member to a predetermined extent.

* * * * *